United States Patent
Shoham et al.

(10) Patent No.: US 12,386,947 B2
(45) Date of Patent: *Aug. 12, 2025

(54) TECHNIQUES FOR SECURING NETWORK ENVIRONMENTS BY IDENTIFYING DEVICE ATTRIBUTES BASED ON STRING FIELD CONVENTIONS

(71) Applicant: Armis Security Ltd., Tel Aviv (IL)

(72) Inventors: Ron Shoham, Tel Aviv (IL); Tom Hanetz, Tel Aviv (IL); Yuval Friedlander, Petah Tikva (IL); Gil Ben Zvi, Hod Hasharon (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,000

(22) Filed: Jun. 3, 2024

(65) Prior Publication Data

US 2025/0036748 A1 Jan. 30, 2025

Related U.S. Application Data

(63) Continuation of application No. 17/344,294, filed on Jun. 10, 2021, now Pat. No. 12,026,248.

(51) Int. Cl.
*G06F 21/51* (2013.01)
*G06F 21/55* (2013.01)

(52) U.S. Cl.
CPC ............ *G06F 21/51* (2013.01); *G06F 21/552* (2013.01); *G06F 2221/2141* (2013.01)

(58) Field of Classification Search
CPC ............................... G06F 21/51; G06F 21/552
See application file for complete search history.

(56) References Cited

U.S. PATENT DOCUMENTS

| | | |
|---|---|---|
| 7,165,240 B2 | 1/2007 | Patterson |
| 7,836,079 B2 | 11/2010 | Kumar et al. |

(Continued)

FOREIGN PATENT DOCUMENTS

| | | | | |
|---|---|---|---|---|
| CA | 2326194 C | 2/2009 | | |
| CN | 110502677 A | * 11/2019 | ............ | G06F 16/906 |
| WO | WO-2019064237 A1 | * 4/2019 | ............ | G06K 9/6218 |

OTHER PUBLICATIONS

Aechan Kim • Mohyun Park • Dong Hoon Lee: AI-IDS; Application of Deep Learning to Real-Time Web Intrusion Detection; IEEE Access (vol. 8, 2020, pp. 70245-70261); (Year: 2020).*

(Continued)

*Primary Examiner* — Luu T Pham
*Assistant Examiner* — Chao Wang
(74) *Attorney, Agent, or Firm* — Perkins Coie LLP (57) ABSTRACT

A system and method for identifying device attributes based on string field conventions. A method includes applying at least one machine learning model to an application data set extracted based on a string indicated in a field of device data corresponding to a device, wherein each of the at least one machine learning model is trained based on a training data set including a plurality of second strings and a plurality of device attribute labels, wherein each device attribute label corresponds to a respective second string of the plurality of second strings, wherein each of the at least one machine learning model is configured to output a predicted device attribute for the device based on the first string; and identifying, based on the output of the at least one machine learning model, a device attribute of the device.

13 Claims, 5 Drawing Sheets

(56) References Cited

U.S. PATENT DOCUMENTS

| | | | |
|---|---|---|---|
| 8,972,539 | B2 | 3/2015 | Carriere |
| 10,831,994 | B2 | 11/2020 | Iyengar |
| 10,979,848 | B1 | 4/2021 | Palappetty et al. |
| 2017/0070517 | A1 | 3/2017 | Bailey et al. |
| 2017/0084269 | A1* | 3/2017 | Shi ................. G06F 40/30 |
| 2019/0140994 | A1* | 5/2019 | Snider ................. H04L 51/234 |
| 2019/0380037 | A1 | 12/2019 | Lifshitz et al. |
| 2020/0311557 | A1 | 10/2020 | Jin |
| 2020/0412757 | A1* | 12/2020 | Siddiq ................. H04L 63/1433 |
| 2022/0247786 | A1* | 8/2022 | Vavilala ................. G06N 20/00 |

OTHER PUBLICATIONS

Anna L. Buczak • Erhan Guven; A Survey of Data Mining and Machine Learning Methods for Cyber Security Intrusion Detection; IEEE Communications Surveys & Tutorials (vol. 18, Issue: 2, 2016, pp. 1153-1176); (Year: 2016).*

Seraphin B. Calo • Dinesh Verma • Maroun Touma • Franck Le • Douglas Freimuth • Erich Nahum; An AI Enabled System for Distributed System Characterization; 2019 IEEE International Conference on Cognitive Computing (ICCC) (2019, pp. 10-18); (Year: 2019).*

Anonymous authors; "Neural Networks with Block Diagonal Inner Product Layers"; https://openreview.net/pdf?id=Hy15ro0pW; 2018.

Kim, Aechan; Park, Mohyun; Lee, Dong Hoon; AI-IDS: Application of Deep Learning to Real-Time Web Instrusion Detection; IEEE Access (vol. 8, pp. 70245-70261); (Year: 2020).

Li, Qianmu; Meng, Shunmei; Zhang, Sainan; Wu, Ming; Zhang, Jing; Ahvanooey, Milad Taleby; Aslam, Muhammad Shamrooz; Safety Risk Monitoring of Cyber-Physical Power Systems Based on Ensemble Learning Algorithm; IEEE Access (vol. 7, pp. 24788-24805); (Year: 2019).

Minoli, Daniel; Occhiogrosso, Benedict; Current and Evolving Applications to Network Management; Wiley-IEEE Press 2023 (Edition: 1); (Year: 2023).

International Search Report and Written Opinion of International Searching Authority for PCT/US2022/055209; ISA/IL; Jerusalem, Israel; Dated: Sep. 4, 2022.

* cited by examiner

TECHNIQUES FOR SECURING NETWORK ENVIRONMENTS BY IDENTIFYING DEVICE ATTRIBUTES BASED ON STRING FIELD CONVENTIONS

CROSS-REFERENCE TO RELATED APPLICATION(S)

This application is a continuation of U.S. Non-Provisional patent application Ser. No. 17/344,294, filed Jun. 10, 2021, the entire contents of which are incorporated herein by reference.

TECHNICAL FIELD

The present disclosure relates generally to cybersecurity for network environments, and more specifically to using device attributes identified based on string field conventions in order to improve cybersecurity for a network environment.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that appropriate mitigation actions are taken.

The challenge involved with profiling a user device is magnified by the fact there is no industry standard for querying and/or obtaining information from user devices, user devices, and so on. This challenge is particularly relevant when attempting to identify device attributes. As new types of devices come out frequently and there is not a single uniform standard for identifying type in data sent from these devices, identifying the types of devices accessing a network environment is virtually impossible.

More specifically, as device data is obtained from various sources, device attributes such as device type may be absent or conflicting in data from the various sources. For example, this may be caused by partial visibility over network traffic data due to deployment considerations, partial coverage due to sampled traffic data as opposed to continuously collected traffic data, continuous and incremental collection of device data over time, and conflicting data coming from different sources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying device attributes based on string field conventions. A method includes applying at least one machine learning model to an application data set extracted based on a string indicated in a field of device data corresponding to a device, wherein each of the at least one machine learning model is trained based on a training data set including a plurality of second strings and a plurality of device attribute labels, wherein each device attribute label corresponds to a respective second string of the plurality of second strings, wherein each of the at least one machine learning model is configured to output a predicted device attribute for the device based on the first string; and identifying, based on the output of the at least one machine learning model, a device attribute of the device.

Certain embodiments disclosed herein also include a non-transitory computer readable medium having stored thereon causing a processing circuitry to execute a process, the process comprising: applying at least one machine learning model to an application data set extracted based on a string indicated in a field of device data corresponding to a device, wherein each of the at least one machine learning model is trained based on a training data set including a plurality of second strings and a plurality of device attribute labels, wherein each device attribute label corresponds to a respective second string of the plurality of second strings, wherein each of the at least one machine learning model is configured to output a predicted device attribute for the device based on the first string; and identifying, based on the output of the at least one machine learning model, a device attribute of the device.

Certain embodiments disclosed herein also include a system for identifying device attributes based on string field conventions. The system comprises: a processing circuitry; and a memory, the memory containing instructions that, when executed by the processing circuitry, configure the system to: apply at least one machine learning model to an application data set extracted based on a string indicated in a field of device data corresponding to a device, wherein each of the at least one machine learning model is trained based on a training data set including a plurality of second strings and a plurality of device attribute labels, wherein each device attribute label corresponds to a respective second string of the plurality of second strings, wherein each of the at least one machine learning model is configured to output a predicted device attribute for the device based on the first string; and identify, based on the output of the at least one machine learning model, a device attribute of the device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges noted above with respect to absent or conflicting data from different sources and acknowledging that device names are commonly available even among different data sources, it has been identified that device names for the same type of device in the same data source tend to comply with certain conventions and patterns.

It has been further identified that conventions and patterns may be learned via machine learning in order to consistently and accurately identify types of devices by matching patterns to learned string field conventions. A string field convention is a convention used for data entered into a particular field which accepts string values. Such machine learning provides a more objective process for identifying string field conventions than would be possible for human operators subjectively evaluating whether device names are "similar" in ways that reflect a common convention with respect to a given field which accepts data in the form of strings of characters. Additionally, using machine learning as described herein provides more accurate predictions of device attributes without requiring manual definition, tuning, or maintenance of device string field conventions by a human operator, thereby allowing for effectively automating the process of device attribute identification. In an example implementation, the device attribute to be identified is device type, and the string field convention is a device naming convention used for fields storing strings which represent device names.

It has also been identified that neural networks may provide a suitable mechanism by which string field conventions can be detected. Consequently, improvements to such neural networks which allow them to process device names in a manner that improves accuracy of string field convention determination can be utilized to improve techniques leveraging neural networks for this purpose. Accordingly, the disclosed embodiments provide designs, configurations, and arrangements of neural networks that further improve device attribute identification.

Accordingly, the disclosed embodiments provide techniques for securing network environments that utilize these properties of device name data. More specifically, the disclosed embodiments include techniques for identifying device attributes based on string field conventions of device data as well as techniques for securing network environments based on these identified device attributes. The disclosed embodiments utilize neural networks to learn and then subsequently identify device attributes based on string field conventions of device data. The neural network includes an inner product layer which further improves accuracy of the device attribute identification and distinguishes among inputs with respect to characters making up strings among the device data.

The various disclosed embodiments include a method and system for securing network environments by identifying device attributes based on string field conventions. A training data set is created by obtaining device data including strings representing information about devices fetched from many sources and labeling the strings of the device data with corresponding device attribute labels. One or more neural networks is trained, in a supervised machine learning process, using a labeled training data set which includes the strings and corresponding device attribute labels. Each neural network is trained such that it outputs a vector of probabilities for each label among the training data set based on input strings extracted from a given type of field in device data.

In various embodiments, an ensemble of neural networks may be trained for each type of field. As a non-limiting example, an ensemble of neural networks may be trained for the field "device name" such that each neural network of the ensemble takes strings representing device names extracted from a "device name" field in device data and outputs classifications representing respective device attributes indicated by the input strings.

Each neural network may be trained, for example but not limited to, for a respective network environment or group of network environments using data obtained with respect to those respective network environments. In some implementations, each neural network is a shallow net including an inner product layer as a hidden layer.

Once the neural networks have been trained, the neural networks are applied to an application data set including extracted from fields in device data collected with respect to a network environment. The output layer of each neural network outputs a vector of probabilities for each label representing the probability that the label (and, therefore, the device attribute that label represents) matches each of the strings indicated in the device name data. Based on the output vectors, it is determined, for each string, a corresponding device attribute of the device having that device name. In some embodiments, a threshold number of the neural networks must output probabilities indicating the same device attribute before that device attribute is determined for a given device.

Using device attributes identified as described herein, the network environment may be secured automatically and in real-time. To this end, in some embodiments, a policy may be implemented which defines permissible activity for different types of devices, rules for rejecting and blacklisting device attributes that appear to mismatch their respective names, both, and the like. If actions performed by a device which violate the policy are detected, mitigation actions may be performed in order to secure a network environment in which the device is operating.

Figure 1:
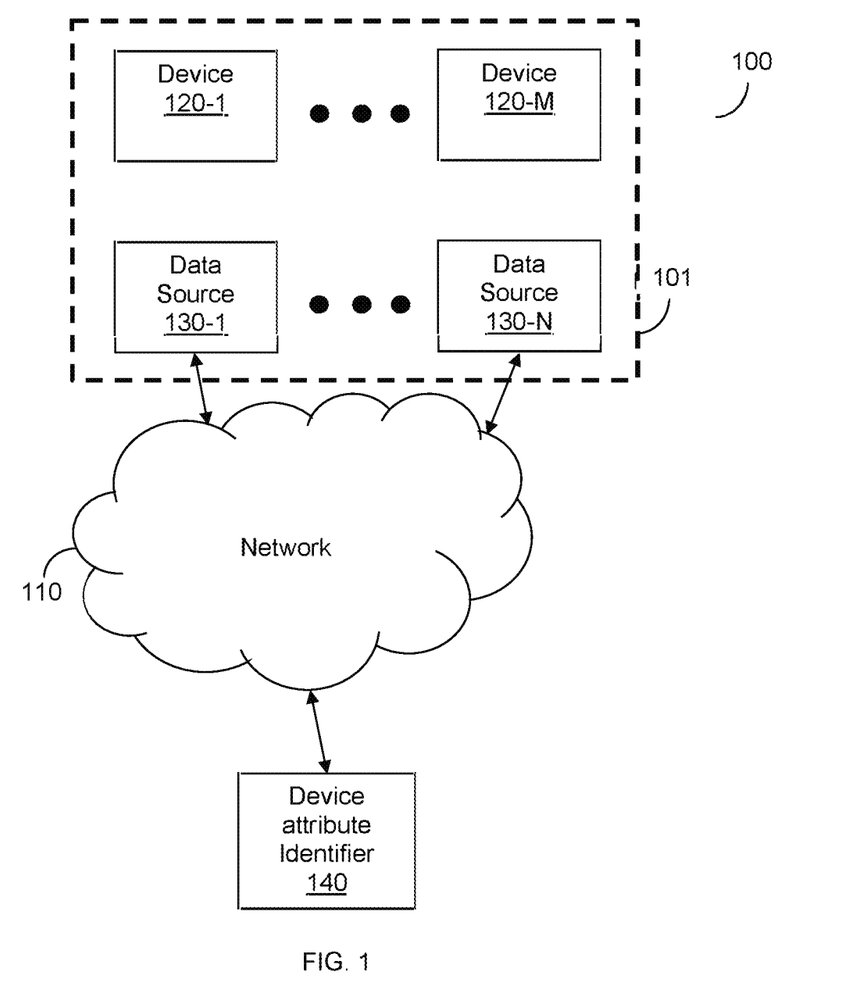
FIG. 1 is a network diagram utilized to describe various disclosed embodiments.

FIG. 1 shows an example network diagram 100 utilized to describe the various disclosed embodiments. In the example network diagram 100, data sources 130-1 through 130-N (hereinafter referred to as a data source 130 or as data sources 130) communicate with a device attribute identifier 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. The data sources 130 may be, but are not limited to, databases, network scanners, both, and the like. Data collected by or in the data sources 130 may be transmitted to the device attribute identifier 140 for use in identifying device attributes as described herein. To this end, such data at least includes strings representing respective information of the devices 120 (e.g., strings representing device names).

Each of the devices 120 may be, but is not limited to, a personal computer, a laptop, a tablet computer, a smartphone, a wearable computing device, or any other device capable of receiving and displaying notifications. Each device 120 may have a respective device name which may be included in data transmitted by the device 120. As discussed herein, such device names or other strings included in device data related to the device may be utilized to determine device attributes such as device type for each of the devices 120.

The device attribute identifier 140 is configured to apply machine learning techniques as described herein in order to determine device attributes of the devices 120 based on respective strings indicated in the data obtained from the data sources 130. More specifically, the device attribute identifier 140 is configured to apply one or more neural networks, each including an inner product layer with nodes representing characters encoded according to an encoding standard such as, but not limited to, American Standard Code for Information Interchange (ASCII). The neural networks may be, but are not limited to, convolutional neural networks (CNNs).

During a training phase, the neural networks are trained based on training data including input strings and labels indicating known device attributes of devices having the respective strings. Accordingly, each neural network is trained to output a probability that each known device attribute is appropriate for a given string. In some embodiments, an ensemble of neural networks is trained and utilized in order to provide more stable predictions. More specifically, when a neural network ensemble is utilized, a threshold number of neural networks of the ensemble must output the same device attribute in order for that device attribute to be determined as appropriate for a device. As a result, inaccurate predictions of device attributes due to bias and other factors which may affect accuracy are mitigated.

It should be noted that the device attribute identifier 140 is depicted as being deployed outside of the network environment 101 and the data sources 130 are depicted as being deployed in the network environment 101, but that these depictions do not necessarily limit any particular embodiments disclosed herein. For example, the device attribute identifier 140 may be deployed in the network environment 101, the data sources 130 may be deployed outside of the network environment 101, or both.

Figure 2:
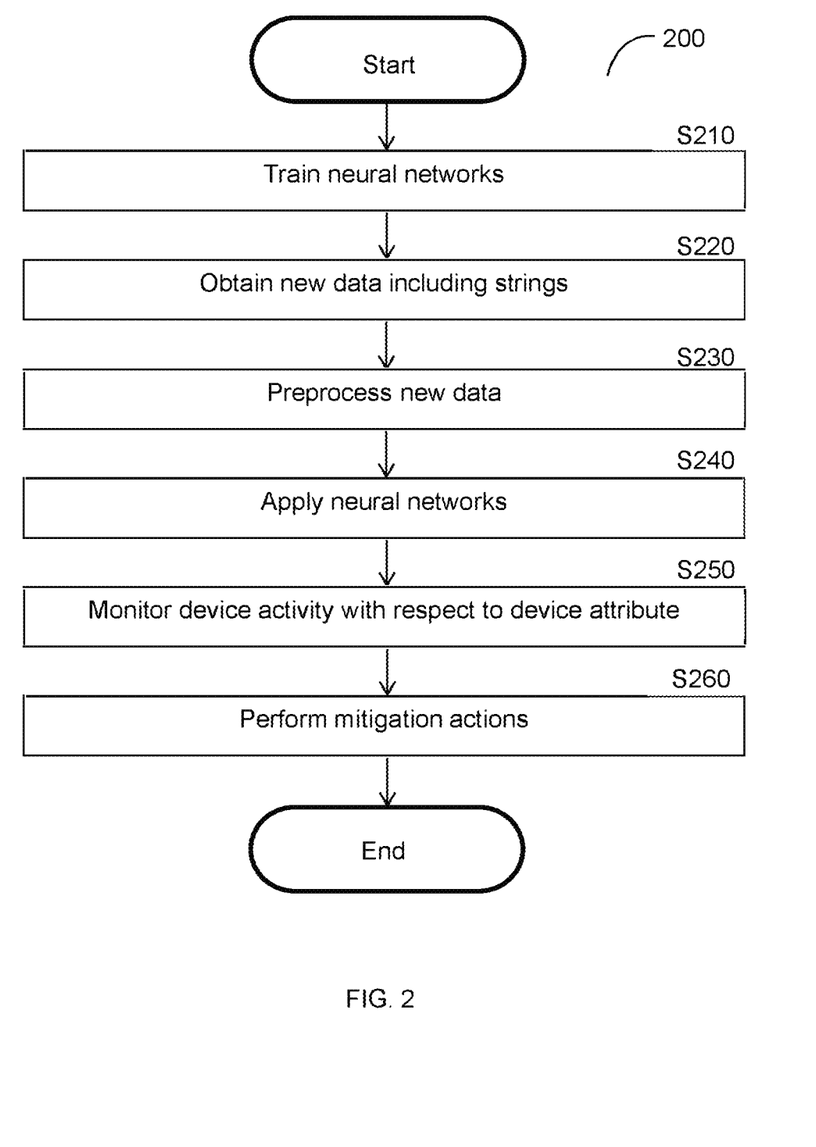
FIG. 2 is a flowchart illustrating a method for securing a network environment by identifying device attributes based on naming conventions according to an embodiment.

FIG. 2 is a flowchart 200 illustrating a method for securing a network environment by identifying device attributes based on string field conventions according to an embodiment. In an embodiment, the method is performed by the device attribute identifier 140, FIG. 1.

At S210, one or more neural networks are trained to yield predictions of device attributes based on strings which may be included in particular fields of device data. In an embodiment, the neural networks are trained using a supervised learning process based on a training data set including strings from device data and corresponding device attribute labels. In another embodiment, an ensemble of neural networks is trained with respect to a device attribute. Each neural network of the ensemble, when applied to subsequent application data, outputs a respective prediction of the device attribute. The results from the neural networks may be compared such that, for example, a threshold number of neural networks of the ensemble must output the same device attribute in order for that device attribute to be identified.

Figure 3:
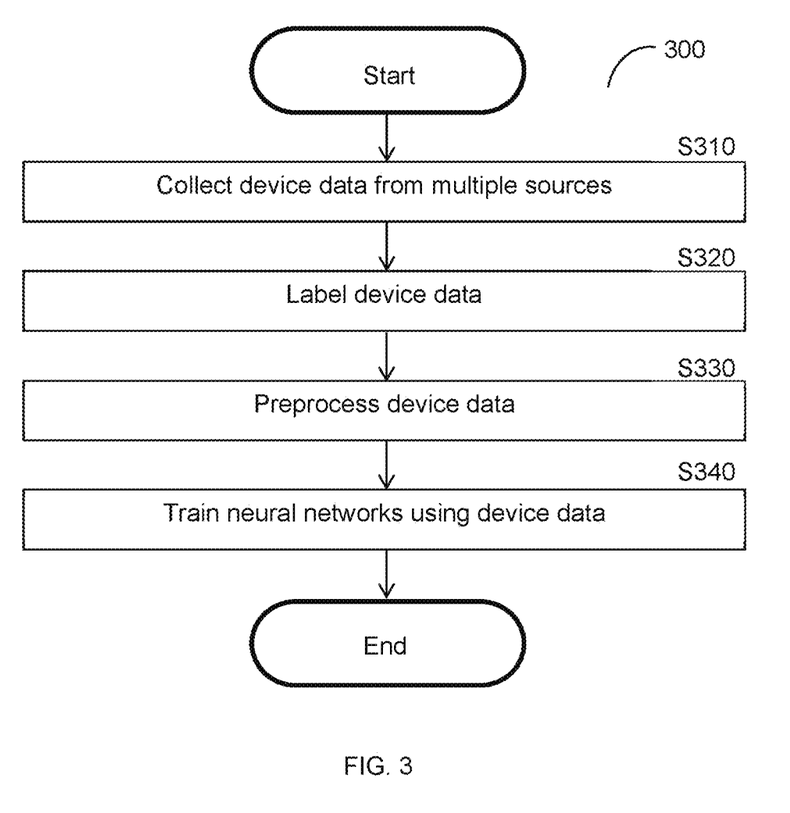
FIG. 3 is a flowchart illustrating a method for training a neural network to identify device attributes based on string field conventions according to an embodiment.

The process of training the neural networks is now described with respect to FIG. 3. FIG. 3 is a flowchart S210 illustrating a method for training a neural network to identify device attributes based on string field conventions according to an embodiment.

At S310, strings indicated in device data communicated by and with respect to devices is collected from multiple sources. Such sources may include, but are not limited to, network devices used for integration by different management and monitoring platforms, devices using different network protocols (e.g., DHCP, KERBEROS, SPOOLSS, SNMP, etc.), combinations thereof, and the like. Each string indicates information about a respective device such as, but not limited to, a device name of the device.

At S320, the collected device data is labeled. In an embodiment, S320 includes providing each string to an operator (e.g., via a user interface) and receiving user inputs indicating the device attribute corresponding to each string indicated in the collected device data.

At optional S330, the device data may be preprocessed. In an embodiment, S330 includes converting the strings of the device data into encoded values from alphabetical values. As a non-limiting example, a string including alphabetical values may be converted into a set of ASCII values.

At S340, one or more neural networks are trained based on the labeled device data. Each neural network is trained to predict a device attribute based on inputs indicating strings of the device data. The neural networks are trained with respect to different tenants (i.e., owners or operators of network environments) such that different sets of neural networks are trained based on device names used by devices accessing different tenants' network environments. In other words, a given set of neural networks is trained based on a respective tenant's device string field conventions because device string field conventions typically vary by tenant.

In an embodiment, the training is performed iteratively in order to find optimal weights for the neural network. In a further embodiment, at each iteration, a random subset of devices (e.g., as represented by a randomly selected subset of device names among device names in the device name data) with known device attributes (e.g., device attributes indicated by respective labels) are shuffled and utilized to generate predictions and corresponding probabilities. An error function (e.g., a Cross-Entropy error function) is utilized to calculate the average error in order to determine the gradient and update the weights accordingly. One or more respective thresholds is calculated for each neural network based on its precision and recall performance with respect to each predicted device attribute.

In an example implementation, each neural network may be configured to classify devices with respect to device attributes, and the calculated thresholds for each neural network include multiple thresholds each corresponding to a respective label used by the neural network. In some implementations, each neural network may be trained to output an "indeterminate" device attribute or otherwise provide an output indicating that a device attribute could not be identified if none of the outputs with respect to any of the potential labels is above the respective threshold for that label.

In an embodiment, the neural networks are arranged as an ensemble including multiple neural networks. The ensemble is at least specific to a particular device attribute. In this regard, it is noted that the randomized nature of a training process used by neural networks (e.g., randomized splitting of data into batches, randomized initialization of the model weights, etc.) tends to create inconsistencies in resulting model predictions. Using an ensemble of neural networks allows for mitigating bias which might be caused by any given randomization.

In a further embodiment, the ensemble may further be tenant-specific. In other words, any given ensemble includes multiple neural networks trained to identify the same device attribute, and for any given tenant who owns or operates a network environment, one or more respective ensembles may be trained to identify respective device attributes of devices interacting in and with the tenant's network environment.

In this regard, it is noted that device naming conventions used by devices vary between network environments. Consequently, training a neural network ensemble for a given network environment and/or tenant rather than globally across different network environments and/or tenants allows for more accurately predicting device attributes based on string field conventions.

Returning to FIG. 2, at S220, new data to which the neural networks should be applied is obtained. The new data includes at least a device name of a device interacting with or in a network environment.

At S230, the new data is preprocessed. In an embodiment, S230 includes extracting features to which the neural networks will be applied. The features at least include strings extracted from particular fields of device data or portions thereof. Such strings may include, but are not limited to, strings representing device names indicated in "device name" fields of the device data. In a further embodiment, such features include subsets of device names. In a non-limiting example implementation, such subsets may include substrings having 6 characters each.

In an embodiment, S230 includes extracting strings from the new data and mapping the extracted device names to device attributes associated with known credible sources. In another embodiment, strings outside of a predetermined length range (e.g., between 3 and 20 characters) are filtered out. The predetermined length range may differ for different types of fields.

In an embodiment, S230 further includes converting strings into encoded values from alphabetical values. As a non-limiting example, a device name including alphabetical values may be converted into a set of ASCII values. In an example implementation, the inputs to the neural network are vectors representing respective characters of the string. When the string is converted into ASCII values, such an input vector may include various values corresponding to respective characters of the ASCII encoding scheme, with each value being either 0 (i.e., the vector does not represent that character) or 1 (i.e., the vector represents that character).

Figure 4:
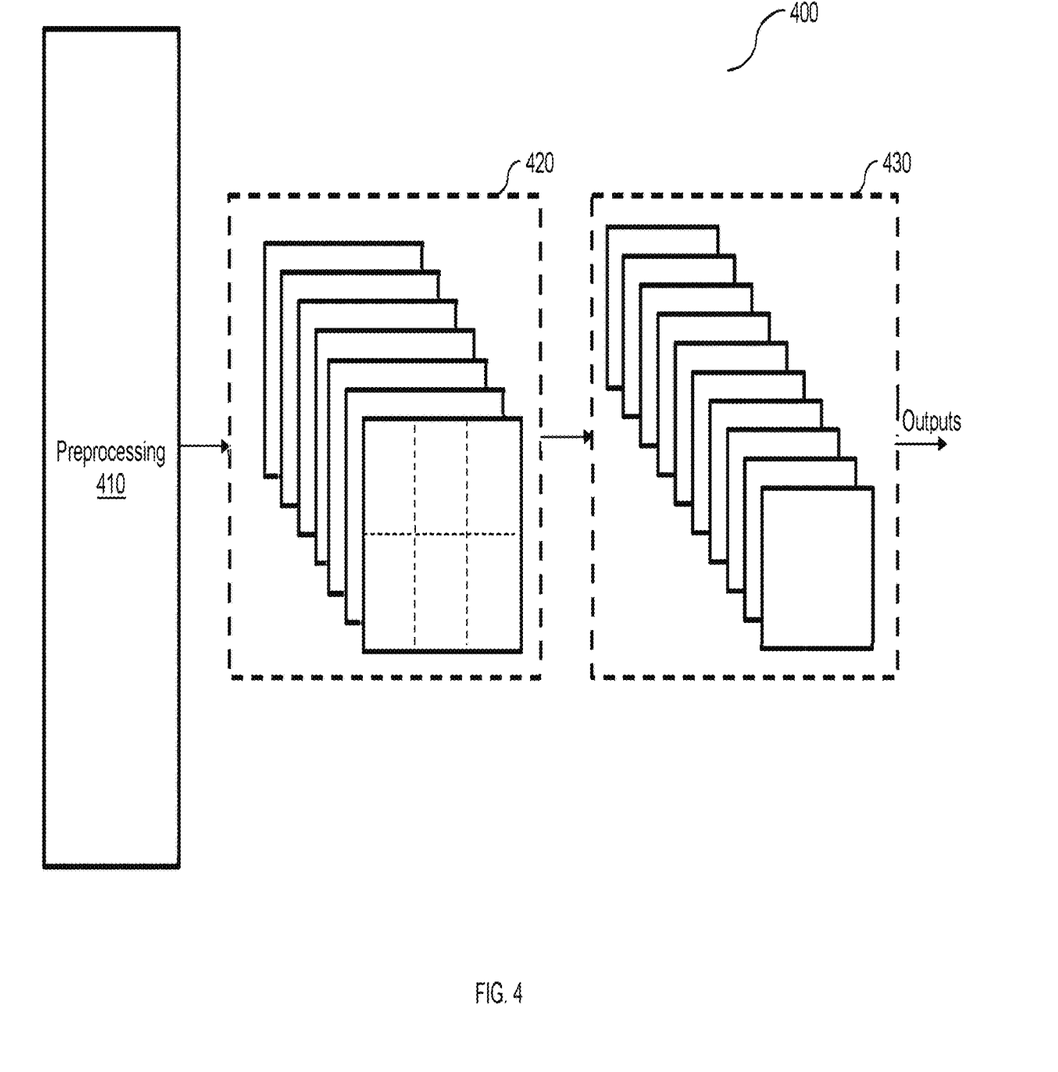
FIG. 4 is a neural network diagram illustrating a neural network used according to an embodiment.

An examples preprocessing of data is described further below with respect to the preprocessing stage 410 of the neural network diagram 400.

At S240, the neural networks are applied to at least a portion of the new data in order to identify a device attribute for one or more devices indicated in the new data.

In an embodiment, each neural network has at least two layers: a convolutional layer and a fully connected layer. The convolutional layer applies filters to input data in order to output a feature map including values representing a degree of similarity between a portion of the input data and one of the filters. The feature map is input to the fully connected layer, which is configured to perform linear transformation using matrix multiplication and to apply an activation function. In a further embodiment, the output of each neural network is a probability vector indicating a probability for each potential label (i.e., for different known device attributes). In some embodiments, the device attribute represented by the label having the highest probability is output by the neural network as the device attribute for a device.

In a further embodiment, S240 includes identifying a device attribute based on the outputs of multiple neural networks which constitute a neural network ensemble. In some embodiments, a device attribute is only identified for the device if at least a predetermined threshold number or proportion of the neural networks output that device attribute. Requiring multiple neural networks to output the same device attribute before identifying that device attribute as appropriate for a given device prevents bias or other inaccuracies in one neural network from affecting the accuracy of the overall ensemble.

At optional S250, device activity of the devices indicated in the new data is monitored with respect to the respective identified device attributes. In an embodiment, one or more policies define allowable behavior for devices for different types of devices such that, when a device having a certain device attribute deviates from the behavior indicated in the policy for that device attribute, the device's current behavior can be detected as abnormal and potentially requiring mitigation.

At optional S260, mitigation actions are performed with respect to one or more devices based on the device attributes for those devices. The mitigation actions may include, but are not limited to, severing communications between a device and one or more other devices or networks, generating an alert, sending a notification (e.g., to an administrator of a network environment), restricting access by the device, blocking devices (e.g., by adding such devices to a blacklist), combinations thereof, and the like. In some embodiments, devices having certain device attributes may be blacklisted such that those device attributes are disallowed, and the mitigation actions may include blocking or severing communications with devices having the blacklisted device attributes.

FIG. 4 is a neural network diagram 400 illustrating a neural network used according to an embodiment.

As shown in FIG. 4, the neural network diagram 400 depicts a preprocessing stage 410 followed by processing via a two-layer convolutional neural network including a convolutional layer 420 and a fully connected layer 430. The input to the preprocessing stage 410 is a string of characters in a particular field (e.g., a string indicated as device name data) in data transmitted by a device, a system communicating with the device, a network scanner, and the like.

In an embodiment, at the preprocessing stage 410, the input string of characters is transformed into a set of vectors such as, but not limited to, one-hot vectors. Each vector represents a character (e.g., an ASCII character), and has multiple entries. Each entry of the vector represents a character, and one of the entries is marked (e.g., via including a 1 value instead of a 0 value) to indicate which character the vector represents.

In an embodiment, the vectors created via the preprocessing stage 410 are input to the convolutional layer 420. In an example implementation, the convolutional layer 420 has 7 filters of size 6 each. Each filter is a two-dimensional array of weights such that each of the 7 filters includes 6 weights. Each filter is applied to substrings of the string of characters and, in an example implementation, each such substring includes 6 characters from among the string of characters. The output of the convolutional layer 420 is a feature map including values for each substring of the string of characters. Each value represents a degree of similarity between one of the filters and the substring. A discretization process such as max-pooling may be utilized to choose a maximum value from among the values output by the filters.

In an embodiment, the output of the convolutional layer 420 is input to the fully connected layer 430. In some embodiments, the fully connected layer 430 includes nodes configured to perform linear transformation using matrix multiplication as well as an activation function (e.g., the soft-max activation function). In a further embodiment, the output of the convolutional neural network is a probability vector including one entry for each potential label, where each entry indicates the probability that a string of characters belongs to that label and each potential label represents a distinct device attribute.

The convolutional neural network described above allows for generating predictions of device attribute based on device string field conventions as well as for providing explanations regarding patterns on which the predictions are based.

It should be noted that the neural network diagram 400 depicts a shallow neural network including only 2 layers merely for simplicity purposes, and that deeper neural networks including more layers may be utilized without departing from at least some disclosed embodiments. In other embodiments, a shallow neural network is utilized to avoid overfitting and to optimize training and application of the neural network with respect to the tradeoffs between accuracy of results and time and processing power required for machine learning functions.

It should also be noted that particular numbers of nodes are depicted in FIG. 4 merely for simplicity purposes, but that the number of nodes utilized are not limited to the numbers of nodes shown in FIG. 4.

Figure 5:
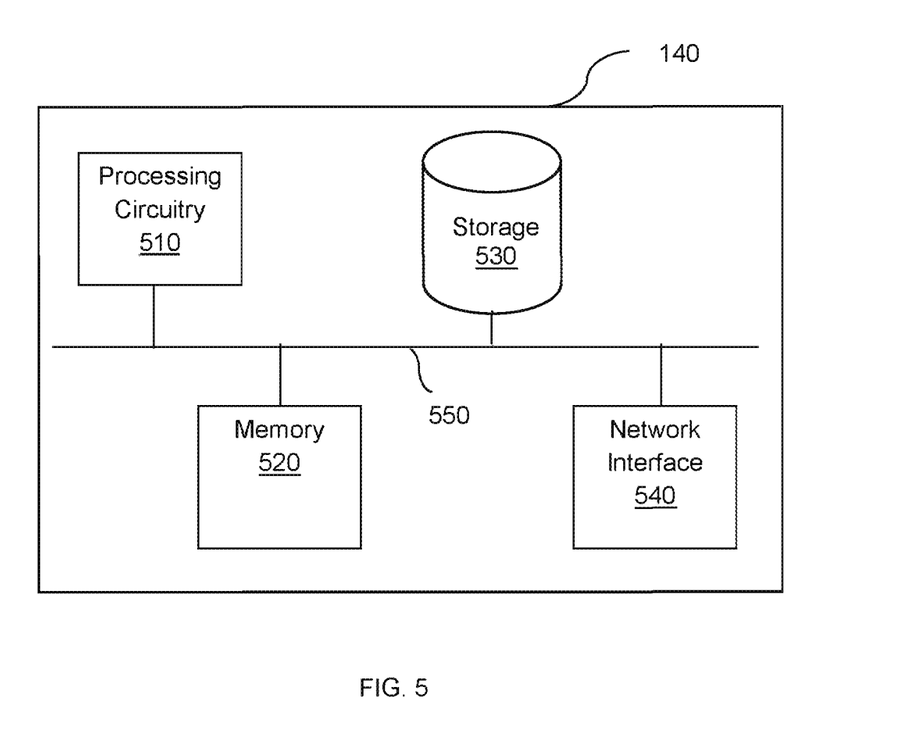
FIG. 5 is a schematic diagram of a type identifier according to an embodiment.

FIG. 5 is an example schematic diagram of a device attribute identifier 140 according to an embodiment. The device attribute identifier 140 includes a processing circuitry 510 coupled to a memory 520, a storage 530, and a network interface 540. In an embodiment, the components of the device attribute identifier 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the device attribute identifier 140 to communicate with, for example, the data sources 130, FIG. 1.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

We claim:

1. A method for identifying device attributes based on string field conventions, comprising:
    applying at least one machine learning model to an application data set extracted based on a first string indicated in a field of device data corresponding to a network device, wherein the application data set is extracted by generating a plurality of substrings of the first string, wherein each of the at least one machine learning model is applied to each of the plurality of substrings, wherein each of the at least one machine learning model is a neural network including a convolutional layer, wherein the convolutional layer of each neural network includes a plurality of filters, wherein each filter of each convolutional layer is applied to each of the plurality of substrings and outputs a value representing a degree of similarity between the filter and each applied substring, wherein each of the at least one machine learning model is trained based on a training data set collected from a network environment, the training data including a plurality of second strings and a plurality of device attribute labels, wherein each device attribute label corresponds to a respective second string of the plurality of second strings, wherein each of the at least one machine learning model is configured to output a predicted device attribute for the network device based on the first string;
    identifying, based on the output of the at least one machine learning model, a device attribute of the network device;
    determining at least one network activity policy corresponding the identified device attribute of the network device;
    monitoring network activity of the network device with respect to the at least one network activity policy corresponding to the identified device attribute of the network device; and
    when the monitored network activity of the network device violates the at least one network activity policy, performing at least one mitigation action based on the monitored network activity.

2. The method of claim 1, wherein the at least one machine learning model is an ensemble including a plurality of machine learning models, wherein the device attribute is identified based on the output of each of the plurality of machine learning models.

3. The method of claim 2, wherein the identified device attribute is a device attribute which was output by at least a threshold number of machine learning models of the ensemble.

4. The method of claim 1, wherein each neural network further includes a fully connected layer, wherein the fully connected layer of each neural network is configured to output a probability vector including a plurality of entries indicating a probability that the network device has a device attribute corresponding to each of the plurality of device attribute labels.

5. The method of claim 4, wherein each neural network consists of the convolutional layer and the fully connected layer.

6. The method of claim 1, further comprising:
    determining that the network device has a disallowed device attribute based on the identified device attribute; and
    blocking the network device having the disallowed device attribute from accessing at least one network environment.

7. A non-transitory computer readable medium having stored thereon instructions for causing a processing circuitry to execute a process, the process comprising:
    applying at least one machine learning model to an application data set extracted based on a first string indicated in a field of device data corresponding to a network device, wherein the application data set is extracted by generating a plurality of substrings of the first string, wherein each of the at least one machine learning model is applied to each of the plurality of substrings, wherein each of the at least one machine learning model is a neural network including a convolutional layer, wherein the convolutional layer of each neural network includes a plurality of filters, wherein each filter of each convolutional layer is applied to each of the plurality of substrings and outputs a value representing a degree of similarity between the filter and each applied substring, wherein each of the at least one machine learning model is trained based on a training data set collected from a network environment, the training data, including a plurality of second strings and a plurality of device attribute labels, wherein each device attribute label corresponds to a respective second string of the plurality of second strings, wherein each of the at least one machine learning model is configured to output a predicted device attribute for the network device based on the first string;
    identifying, based on the output of the at least one machine learning model, a device attribute of the network device;
    determining at least one network activity policy corresponding the identified device attribute of the network device;
    monitoring network activity of the network device with respect to the at least one network activity policy corresponding to the identified device attribute of the network device; and
    when the monitored network activity of the network device violates the at least one network activity policy, performing at least one mitigation action based on the monitored network activity.

8. A system for identifying device attributes based on string field conventions, comprising:

a processing circuitry; and a memory, the memory containing instructions that, when executed by the processing circuitry, configure the system to:

apply at least one machine learning model to an application data set extracted based on a first string indicated in a field of device data corresponding to a network device, wherein the application data set is extracted by generating a plurality of substrings of the first string, wherein each of the at least one machine learning model is applied to each of the plurality of substrings, wherein each of the at least one machine learning model is a neural network including a convolutional layer, wherein the convolutional layer of each neural network includes a plurality of filters, wherein each filter of each convolutional layer is applied to each of the plurality of substrings and outputs a value representing a degree of similarity between the filter and each applied substring, wherein each of the at least one machine learning model is trained based on a training data set collected from a network environment, the training data, including a plurality of second strings and a plurality of device attribute labels, wherein each device attribute label corresponds to a respective second string of the plurality of second strings, wherein each of the at least one machine learning model is configured to output a predicted device attribute for the network device based on the first string;

identify, based on the output of the at least one machine learning model, a device attribute of the network device;

determining at least one network activity policy corresponding the identified device attribute of the network device;

monitoring network activity of the network device with respect to the at least one network activity policy corresponding to the identified device attribute of the network device; and when the monitored network activity of the network device violates the at least one network activity policy, performing at least one mitigation action based on the monitored network activity.

9. The system of claim 8, wherein the at least one machine learning model is an ensemble including a plurality of machine learning models, wherein the device attribute is identified based on the output of each of the plurality of machine learning models.

10. The system of claim 9, wherein the identified device attribute is a device attribute which was output by at least a threshold number of machine learning models of the ensemble.

11. The system of claim 8, wherein each neural network further includes a fully connected layer, wherein the fully connected layer of each neural network is configured to output a probability vector including a plurality of entries indicating a probability that the network device has a device attribute corresponding to each of the plurality of device attribute labels.

12. The system of claim 11, wherein each neural network consists of the convolutional layer and the fully connected layer.

13. The system of claim 8, wherein the system is further configured to:

determine that the network device has a disallowed device attribute based on the identified device attribute; and block the network device having the disallowed device attribute from accessing at least one network environment.

* * * * *